United States Patent [19]

Tervo

[11] Patent Number: 5,000,212
[45] Date of Patent: Mar. 19, 1991

[54] BUTTERFLY VALVE METHOD AND APPARATUS EMPLOYING VARIABLY POSITIONABLE PIVOT SHAFT

[75] Inventor: John N. Tervo, Scottsdale, Ariz.

[73] Assignee: Allied-Signal Inc., Morris Township, Morris County, N.J.

[21] Appl. No.: 538,809

[22] Filed: Jun. 15, 1990

[51] Int. Cl.⁵ ............................................... F16K 1/22
[52] U.S. Cl. ......................................... 137/1; 251/218; 251/228; 251/248; 251/283; 251/308
[58] Field of Search ............... 137/1; 251/56, 58, 215, 251/218, 227, 228, 248, 281, 283, 305, 308

[56] References Cited

U.S. PATENT DOCUMENTS

| | | |
|---|---|---|
| 212,556 | 2/1879 | Johnson . |
| 443,326 | 12/1890 | Leverich . |
| 965,322 | 7/1910 | Peterson . |
| 1,167,145 | 1/1916 | Baverey . |
| 1,328,565 | 1/1920 | Howard . |
| 1,541,047 | 6/1925 | Hart . |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green et al. . |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg . |
| 3,200,838 | 8/1965 | Sheaffer . |
| 3,298,659 | 1/1967 | Cupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaier . |
| 3,677,297 | 7/1972 | Walton . |
| 3,794,288 | 2/1974 | Dolder et al. . |
| 3,843,090 | 10/1974 | Schneider .................. 251/228 X |
| 3,960,177 | 6/1976 | Baumann . |
| 3,971,414 | 7/1976 | Illing . |
| 3,982,725 | 9/1976 | Clark . |
| 3,993,096 | 11/1976 | Wilson . |
| 4,084,617 | 4/1978 | Happe . |
| 4,190,074 | 2/1980 | Mailliet et al. . |
| 4,280,681 | 7/1981 | Harris .................... 251/228 X |
| 4,313,592 | 2/1982 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS 2821766 11/1979 Fed. Rep. of Germany .
1533073 11/1978 United Kingdom .

OTHER PUBLICATIONS

"Fishtail vs. Conventional Discs in Butterfly Valves", Carl D. Wilson, Instruments & Control Systems, vol. 41; Mar. 1968.
"The Note on the Reduction of the Fluid Dynamic Torque of Butterfly Valves", D. W. Bryer/D. E. Walshe, National Physical Laboratory; Sep. 1986.

Primary Examiner—Robert G. Nilson
Attorney, Agent, or Firm—Joseph R. Black; James W. McFarland; Robert A. Walsh

[57] ABSTRACT

A butterfly valve method and apparatus (10) employing a variably positionable pivot shaft (30). The apparatus (10) comprises a duct (16), a valve plate (12), and a pivot shaft (30). Near closed rotational positions of the valve plate (12), the plate is pivotally supported by a support shaft (18) which is movably secured to the duct (16). Over a substantial range of open rotational positions, the valve plate (12) is pivotally supported by the pivot shaft (30), which is translationally movable relative to the valve plate (12) so that fluid-dynamic torque exerted on the plate can be altered. The method comprises the steps of rotationally moving the valve plate (12) away from the closed position whereby fluid-dynamic torque is increased, and translationally moving the pivot shaft (30) relative to the valve plate whereby the torque is then decreased.

14 Claims, 2 Drawing Sheets

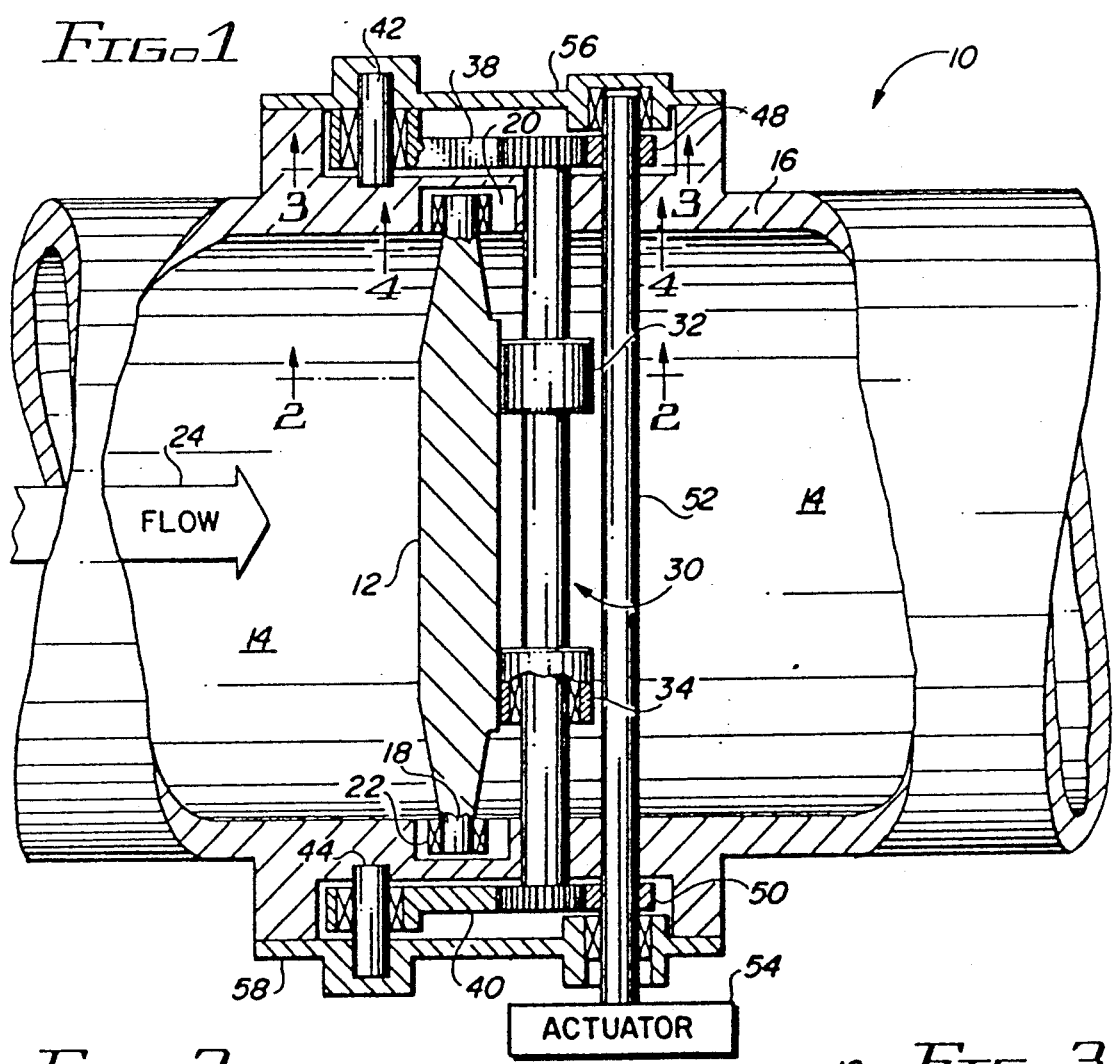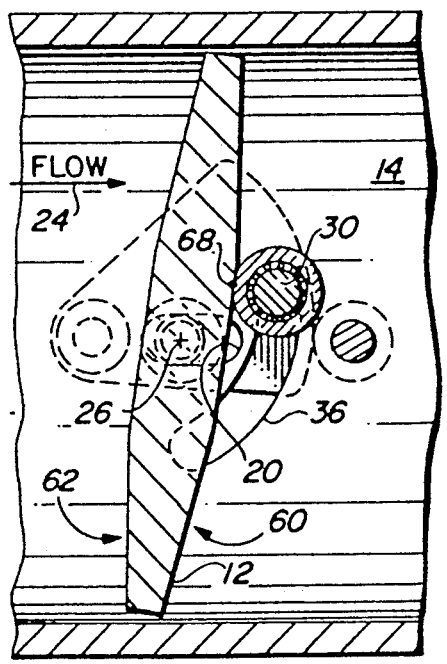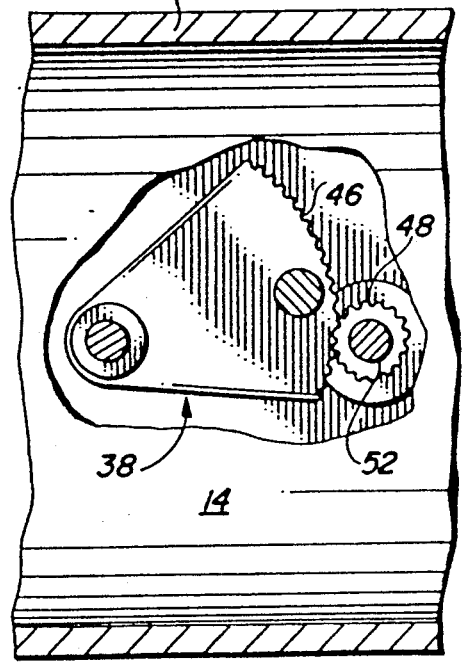

5,000,212

BUTTERFLY VALVE METHOD AND APPARATUS EMPLOYING VARIABLY POSITIONABLE PIVOT SHAFT

Reference is made to the following copending and commonly-owned U.S. patent applications: Ser. No. 374,897 filed on Jun. 30, 1989; Ser. No. 395,234, filed on Aug. 17, 1989; Ser. No. 422,354 filed on Oct. 16, 1989; Ser. No. 426,921 filed on Oct. 24, 1989; one filed on Jun. 6, 1990 and entitled "BALANCED-TORQUE BUTTERFLY VALVE", applicants' Ser. No. 534,091; and three filed on Jun. 6, 1990 and entitled "BUTTERFLY VALVE METHOD AND APPARATUS" applicants' Ser. Nos. 534,054, 534,052, and 533,965. All relate to butterfly valves.

TECHNICAL FIELD

This invention pertains generally to butterfly valves and more specifically to those adapted to provide for relative translational movement between the valve plate and the pivot mechanism in order to achieve more favorable fluid-dynamic-torque conditions at various rotational positions of the valve plate.

BACKGROUND OF THE INVENTION

To applicant's knowledge, the use of relative translational movement in butterfly valves as described above was first set forth in the above-referenced application, Ser. No. 374,897. The importance of such movement is that it is accompanied by a change in the effective areas of the valve plate on each side of the pivot axis or, put differently, by a change in alignment of the pivot axis with the center of pressure exerted by fluid on the valve plate. This enables adjustment of the net torque exerted on the valve plate by the fluid conveyed through the valve. The net torque can be decreased to stabilize the valve plate or to passively facilitate rotation thereof, and it can be increased to actively rotate the plate or facilitate such rotation.

In prior arrangements for effecting the translational movement, the general approach has been to provide a valve plate which is translatable relative to a pivot shaft which has a stationary longitudinal axis. The above-referenced applications, Ser. Nos. 374,897 and 422,354, illustrate arrangements in which the pivot shaft is translationally movable relative to the valve plate when the latter is in a closed position. That movement is provided to offset the pivot axis from the center of static fluid pressure in order to effect initial rotation of the valve plate away from the closed position. Subsequent translational movement for control purposes occurs as movement of the valve plate relative to the pivot shaft. Although it is ostensibly recognized in application Ser. No. 374,897 that translational movement can be provided for control purposes via a pivot shaft which is movable relative to the valve plate, no associated structure has been described.

SUMMARY OF THE INVENTION

The invention is a method for facilitating control of a butterfly valve and a butterfly valve adapted for use with the method.

Unlike previously described butterfly valves that employ translational movement of the valve plate relative to the pivot shaft in order to achieve more favorable fluid-dynamic-torque conditions, the present invention is characterized in that the pivot shaft is used as the translationally movable element when the valve plate is at an open rotational position. An associated advantage is that the axis of rotation of the valve plate can be maintained at a substantially constant position as determined in directions perpendicular to the longitudinal direction of the flow path. This eliminates the need to accommodate translational movement of the valve plate relative to the pivot shaft by suitably shaping the inside surface of the duct, or by downsizing the valve plate in relation to the cross-sectional dimensions of the duct. Another advantage is that power transmission components used to convert rotational movement to translational movement can easily be positioned outside of the flow path while still performing their intended function.

Although illustrated in a circular valve plate/circular flow path configuration, the invention is equally applicable to other butterfly valve configurations including that of a rectangular valve plate/rectangular flow path, and the term "butterfly valve" as used herein is intended to include such other configurations.

The method of the invention comprises the steps of: first, rotationally moving the valve plate away from a closed rotational position to an open rotational position, whereby the valve plate is subjected to increased net torque exerted thereon by the fluid conveyed through the valve; and, second, translationally moving the pivot shaft relative to the valve plate in a direction perpendicular to the longitudinal axis of the former, whereby the net torque is decreased. The first step of the method may be performed by translationally moving the pivot shaft relative to the valve plate so that at the closed rotational position the valve plate opens in response to a substitution of pivot shafts accompanied by a change in the position of the pivot axis. The method may further comprise the step of translationally moving the pivot shaft relative to the valve plate when the latter is at an open rotational position, whereby the net torque is increased and the rotational position of the plate is changed in response to the increase.

Apparatus adapted for use with the above-described method are more specifically described and claimed hereinafter.

BRIEF DESCRIPTION OF THE DRAWINGS

FIG. 1 is a partially fragmentary, cross-sectional view of a butterfly valve adapted for use with the method of the invention. Actuation of the valve is diagrammatically represented.

FIG. 2 is a cross-sectional view taken along line 2—2 of FIG. 1 with the valve plate near its closed rotational position.

FIG. 3 is a partially fragmentary cross-sectional view taken along line 3—3 of FIG. 1 and illustrates in elevation certain power transmission components for use in controlling the position of the pivot shaft.

DESCRIPTION OF THE PREFERRED EMBODIMENT

Figure 4:
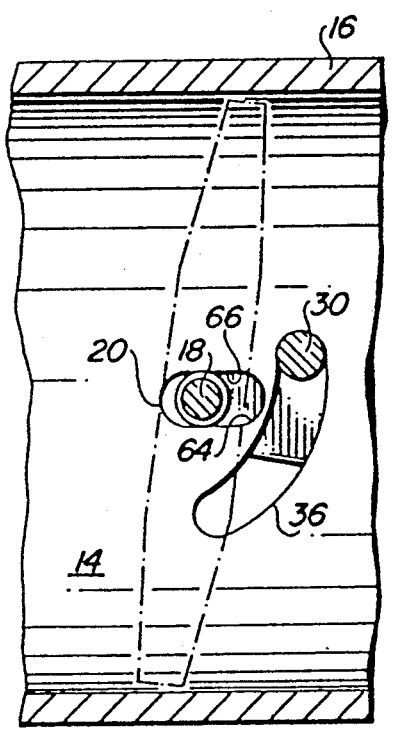
FIG. 4 is a cross-sectional view taken along line 4—4 of FIG. 1 and illustrates slots adapted to permit movement of the valve plate and pivot shaft.
Figure 5:
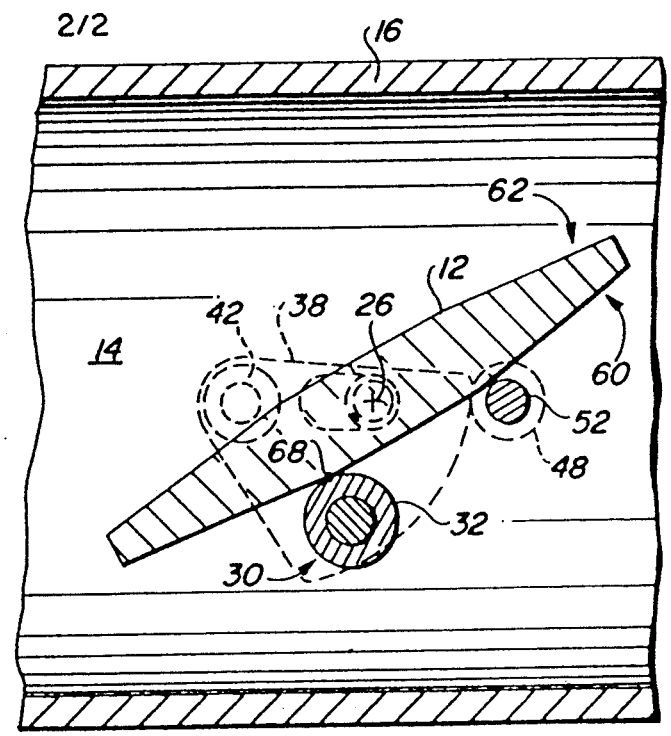
FIG. 5 corresponds in kind to FIG. 2 and shows the valve plate at a fully-open rotational position.
Figure 6:
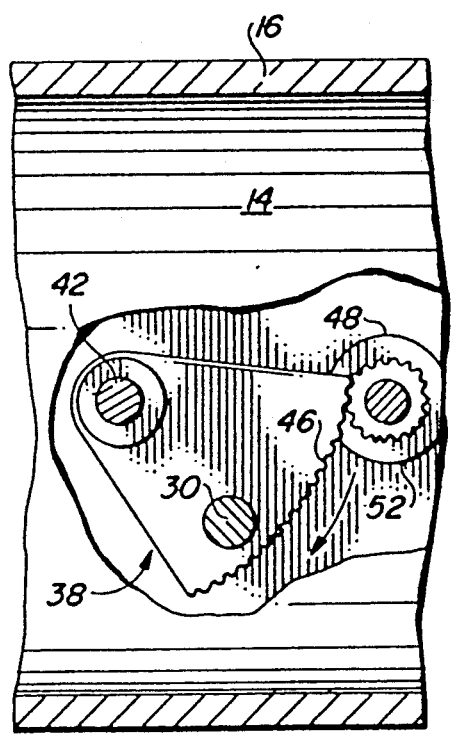
FIG. 6 corresponds in kind to FIG. 3 with the valve plate in the rotational position indicated in FIG. 5.
Figure 7:
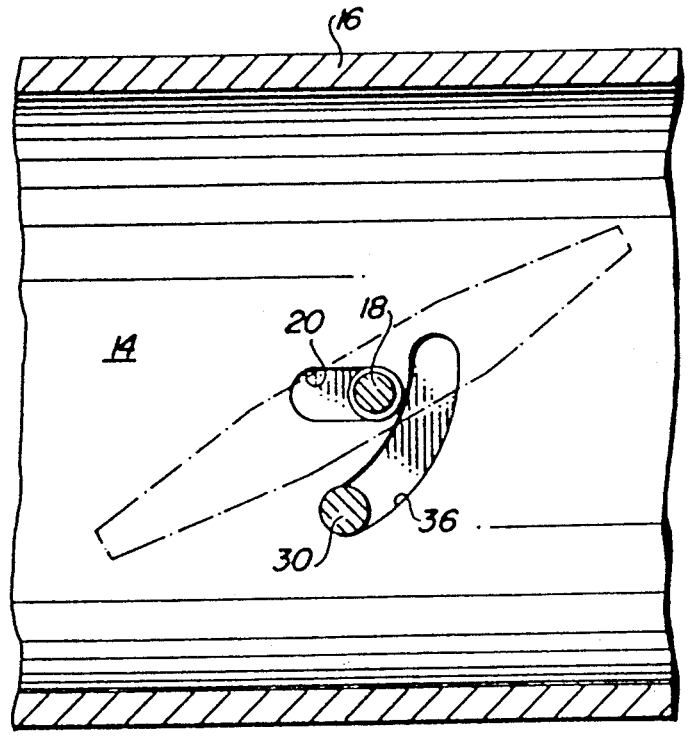
FIG. 7 corresponds in kind to FIG. 4 with the valve plate in the rotational position indicated in FIG. 5.

FIG. 1 of the drawings illustrates a butterfly valve 10 in which a valve plate 12 transects an elongate flow path 14 formed by a duct 16. Typically, the duct 16 is formed in part by a mounting body to which the plate 12 and other components are secured, and separate duct members are connected to the mounting body. The valve plate 12 is supported in the flow path 14 by support shafts (as at 18) which are formed as cylindrical bosses on the valve plate and which extend into slots (as at 20) formed in the duct 16. Alternatively, a single support shaft secured to the valve plate 12 may be used. The support shafts 18 incorporate roller bearings (as at 22) on their ends as indicated so that the valve plate 12 is freely rotatable over a range of rotational positions extending from a closed position (FIG. 1—the closed position being the position at which, in a given application, flow is maximally obstructed, whether or not completely obstructed via sealing contact) to a fully open position (FIG. 5—the fully open position being the position at which, in a given application, flow is minimally obstructed, whether or not the valve plate is parallel to the longitudinal direction of the flow path). The slot 20 is appropriately shaped and dimensioned to permit linear movement of the support shafts 18 in the longitudinal direction 24 of the flow path 14, while substantially preventing movement in directions transverse to both the support shafts and the foresaid longitudinal direction. The longitudinal axis 26 (FIG. 2) of the support shafts 18 defines the axis of rotation for the valve plate 12, and is centered in the flow path 14. A pivot shaft 30 incorporating roller bearings 32, 34 extends across the flow path 14 and through two arcuate slots (as at 36, FIG. 2) formed in opposing sides of the duct 16. The ends of the pivot shaft 30 are pressed into rotationally aligned gearplates 38, 40 so that the shaft is movable with the gearplates. The gearplates 38, 40 are rotatable about axially-aligned shafts 42, 44 which are rigidly secured to the duct 16 and journalled in the gearplates. Each of the gearplates 38, 40 has an arcuate rack gear (as at 46 in FIG. 3) formed in an arcuate edge of the plate. The rack gears 46 engage pinion gears 48, 50 that are rigidly secured to a control shaft 52. The control shaft 52 is journalled in the duct 16 and extends across the flow path 14. At least one end of the control shaft 52 projects from the valve 10 so that the shaft can receive torque applied thereto by an externally-disposed actuator 54. The duct 16 preferably includes cover plates 56, 58 to form a sealed enclosure permitting leakage of fluid through the arcuate slots 36, and easy access to the rack and pinion gears 46, 48, 50.

In use, the roller bearings 32, 34 abut the downstream-facing side 60 of the valve plate 12 and the pivot shaft 30 bears the pressure exerted by high-pressure fluid on the upstream-facing side 62 of the valve plate 12, except when the valve plate 24 nears the closed rotational position. While the support shafts 18 and valve plate 12 are substantially immovable in directions transverse to both the support shafts and the indicated longitudinal direction 14, a very small clearance sufficient to permit rolling movement of the roller bearings 22 in the slot 20 is provided. When the valve plate 12 is near the closed position (as indicated in FIG. 2, for example) and subjected to gravitational force, the support shafts 18 bear against the lower surface 64 of the slot 20. However, when the pivot shaft 30 is sufficiently low (as determined by reference to FIGS. 2, 4, 5, and 7) in the arcuate slots 36, the high-pressure fluid upstream from the valve plate 12 forces the latter very slightly upward so that the support shafts 18 bear against the upper surface 66 of the slot 20. Accordingly, the support shafts 18 function as a pivot shaft over a small range of rotational positions near the closed position, whereas the pivot shaft 30 performs that function over a substantial range of open rotational positions of the valve plate 12 in order to effect fluid-dynamic-torque adjustment. Use of the pivot shaft 30 as such requires that the support shafts 18 not be similarly operative in the forementioned range of rotational positions. On the other hand, the support shaft 18 is needed to ensure that the axis of rotation 26 remains centered in the flow path 14. In order to meet these requirements, movement of the valve plate 12 and support shafts 18 in the longitudinal direction 24 is provided for via the slot 20. Translational movement of the pivot shaft 30 relative to the valve plate 12 follows from rotational movement of the control shaft 52 via the gearplates 38, 40 and pinion gears 48, 50.

The valve plate 12 and pivot shaft 30 cooperate to define a pivot axis therebetween. The pivot axis is indicated by the numeral 68 and can be viewed in FIG. 2 as extending into and out from the drawing. When fluid is conveyed along the flow path 14 with the valve plate 12 in an open position, and when the pivot axis 68 is misaligned with the center of pressure exerted by the fluid on the valve plate, the fluid exerts a net torque on the plate about the pivot axis. To stabilize the valve plate 12 at an open rotational position in accordance with the method of the invention, the pivot shaft 30 is moved so that the pivot axis 68 is as closely aligned with the center of pressure as possible. To move the valve plate 12 to a different rotational position, the pivot shaft 30 is moved to purposely misalign the center of pressure with the pivot axis 68 so that the high-pressure fluid rotates the valve plate in the desired direction. To effect initial opening, the pivot shaft 30 is moved downward past the center of pressure so that the valve plate moves rotationally away from the closed position in response to substitution of the pivot shaft 30 for the support shafts 18 as the operative pivot element, and the consequent change in the position of the pivot axis 68 relative to the center of pressure.

Typically, the duct 16 is adapted to provide a mechanical stop (not shown) that prevents rotational movement of the valve plate 12 past the closed position in a direction viewed as counterclockwise in FIG. 2. In applications requiring complete obstruction of flow at the closed position, a circumferential rim seal is provided around the valve plate 12.

The reader should understand that the foregoing portion of the description, which description includes the accompanying drawings, is not intended to restrict the scope of the invention to illustrated embodiments or to specific details which are ancillary to the teaching contained herein.

What is claimed is:

1. A butterfly valve, comprising:
    a duct forming an elongate flow path for a fluid to be conveyed therethrough;
    a valve plate secured to the duct so as to be positioned in the flow path and rotatable therein about an axis of rotation which extends across the path and is fixed relative to the plate; the valve plate being rotatable over a substantial range of rotational positions whereby flow along the path can be variably obstructed; and a pivot shaft extending across the path and being secured to the duct so as to be movable over an arcuate range of translational movement in directions perpendicular to its own longitudinal axis; the pivot shaft and valve plate being cooperative over the range of rotational positions to define a pivot axis about which the valve plate is pivotable; the pivot axis being variably positionable by the translational movement of the pivot shaft.

2. The invention of claim 1 wherein the valve plate is secured to the duct so as to be linearly movable in longitudinal directions of the flow path and substantially, linearly immovable in other directions.

3. The invention of claim 2 further comprising control means, operable in response to external actuation, for translationally moving the pivot shaft relative to the valve plate.

4. The invention of claim 3 wherein the control means comprises:

a control shaft journalled in the duct and extending across the flow path;

a pinion gear secured to the control shaft so as to be rotatable therewith; and a rack gear secured to the pivot shaft and engaged with the pinion gear.

5. The invention of claim 4 wherein the rack and pinion gears are disposed outside of the flow path.

6. The invention of claim 1 further comprising a rotatable support shaft supporting the valve plate in the flow path and defining the axis of rotation; the support shaft being secured to the duct and the duct being adapted to permit linear movement of the support shaft in longitudinal directions of the flow path; the valve plate being secured to the support shaft so as to move therewith during the linear movement thereof.

7. The invention of claim 6 further comprising control means for translationally moving the pivot shaft relative to the valve plate.

8. The invention of claim 7 wherein the control means comprises:

a rotatable control shaft;

a pinion gear rigidly secured to the control shaft; and a rack gear rigidly secured to the pivot shaft and engaged with the pinion gear.

9. The invention of claim 6 wherein the duct has two opposing slots formed therein, each of the slots having an upper surface and a lower surface; the support shaft extending into the slots and being movable therein in the longitudinal direction of the flow path.

10. The invention of claim 9 wherein the valve is operable to cause the support shaft to bear against the upper surface of the slot when the valve plate is subjected to pressurized fluid and is in the range of rotational positions.

11. In a butterfly valve comprising a duct which forms an elongate flow path containing pressurized fluid; a valve plate secured to the duct so as to be positioned in the flow path and rotatable therein from a closed rotational position at which flow is maximally obstructed to a fully-open rotational position at which flow is minimally obstructed, the valve plate being rotatable about an axis of rotation which is fixed relative to the plate; and a pivot shaft for pivotally supporting the valve plate over a range of rotational positions between the closed and fully-open positions, the pivot shaft having a longitudinal axis; a method for facilitating control of the valve, comprising the steps of:

first, rotationally moving the valve plate from the closed rotational position to an open rotational position whereby the valve plate is subjected to increased net torque exerted thereon by the fluid; and second, translationally moving the pivot shaft relative to the valve plate in a direction perpendicular to the longitudinal axis of the former whereby the net torque is decreased.

12. A method as recited in claim 11 wherein the first step is performed by translationally moving the pivot shaft relative to the valve plate.

13. A method as recited in claim 12 comprising the further step of translationally moving the pivot shaft relative to the valve plate when the latter is at an open rotational position, whereby the net torque is increased and the rotational position of the valve plate is altered in response thereto.

14. A method as recited in claim 11 comprising the further step of translationally moving the pivot shaft relative to the valve plate when the latter is at an open rotational position, whereby the net torque is increased and the rotational position of the valve plate is altered in response thereto.

* * * * *